United States Patent [19]

Inoue

[11] 3,984,870
[45] Oct. 5, 1976

[54] MAGNETIC VIDEO RECORDING AND REPRODUCING APPARATUS HAVING A TAPE THREADING MECHANISM

[75] Inventor: Makoto Inoue, Musashino, Japan

[73] Assignees: TEAC Video Corporation, Kodaira; Sony Corporation, Tokyo, both of Japan

[22] Filed: Nov. 13, 1974

[21] Appl. No.: 523,461

[30] Foreign Application Priority Data
Nov. 17, 1973 Japan.............................. 48-129378

[52] U.S. Cl. ................................. 360/85; 226/91; 360/95
[51] Int. Cl.² ................. G11B 15/66; G11B 23/04; G11B 5/52
[58] Field of Search ............... 360/85, 95; 242/195, 242/197–199; 226/91

[56] References Cited
UNITED STATES PATENTS
3,678,213   7/1972   Sato ..................................... 360/85
3,792,491   2/1974   Inaga ................................... 360/85
3,845,501   10/1974  Katsuta et al. ....................... 360/85
3,851,816   12/1974  Katoh .................................. 360/95
3,871,025   3/1975   Nakamoto ........................... 360/85

Primary Examiner—Alfred H. Eddleman
Attorney, Agent, or Firm—Marshall & Yeasting

[57] ABSTRACT

A magnetic video recording and reproducing apparatus has a magazine receiving section for receiving a tape magazine, a rotary magnetic head assembly, and a tape threading assembly that includes a flat annular rotatable member surrounding the rotary head assembly and partially underlying a magazine received in the receiving section. Means including a hook and a roller are provided on the annular rotatable member to engage a tape in the magazine and, as the rotatable member is rotated, draw it around the rotary magnetic head assembly to a position where the tape is pinched between the roller and a capstan and the tape lies against the rotary head assembly in position to be scanned. Guide pins, cam actuated from the rotatable annular member, move into or out of tape engaging positions as the member rotates.

9 Claims, 11 Drawing Figures

MAGNETIC VIDEO RECORDING AND REPRODUCING APPARATUS HAVING A TAPE THREADING MECHANISM

BACKGROUND OF THE INVENTION

1. Field of the Invention

This invention relates to a magnetic video recording and reproducing apparatus for recording a video signal on a magnetic tape in the form of skew magnetic tracks extending across the magnetic tape at a predetermined angle to its lengthwise direction or reproducing the video signal from the magnetic tape.

2. Description of the Prior Art

There has heretofore been proposed a magnetic video recording and reproducing apparatus for recording a video signal on a magnetic tape in the form of skew magnetic tracks extending across the magnetic tape at a predetermined angle to its lengthwise direction or reproducing said video signal from the magnetic tape, comprising a magazine loading section for loading a magazine having housed therein the magnetic tape; a rotary magnetic head assembly composed of a cylindrical magnetic tape guide surface and a rotary magnetic head; magnetic tape threading means for drawing out the magnetic tape from the magazine loaded on the magazine loading section to thread it around the cylindrical magnetic tape guide; first and second position defining means for defining the position of the magnetic tape threaded around the magnetic tape guide of the rotary magnetic head assembly relative to the cylindrical magnetic tape guide surface thereof on the side of the magazine loading section and on the opposite side therefrom; and magnetic tape drive means for driving the magnetic tape threaded around the magnetic tape guide of the rotary magnetic head assembly.

The reduction of the overall dimension of such a conventional magnetic video recording and reproducing apparatus is limited to a certain extent due to its mechanical construction. Further, magnetic tape threading on magnetic tape guide means by the magnetic tape threading means is not satisfactorily smooth and easy. Especially, it is very difficult to thread the magnetic tape helically around the magnetic tape guide means so as to form skew magnetic tracks on the magnetic tape. Moreover, means for drawing out the magnetic tape from the magazine to thread on the magnetic tape guide means is complicated in construction and, at the same time, it is difficult to smoothly draw out the magnetic tape from the magazine. In addition, means for driving the magnetic tape at a predetermined tension is also complicated in construction. Furthermore, it is difficult to assemble the apparatus while holding the relative positions of the magazine loading section to the rotary magnetic head assembly, the magnetic tape threading means, the first and second position defining means and the magnetic tape drive means, and the rotary magnetic head assembly to each of the first position defining means, the magnetic tape threading means and the second position defining means with high accuracy.

SUMMARY OF THE INVENTION

One object of this invention is to provide a magnetic video recording and reproducing apparatus which is very small in size as compared with the conventional apparatus.

Another object of this invention is to provide a magnetic video recording and reproducing apparatus in which the magnetic tape can be threaded smoothly and easily as compared with the conventional apparatus.

Another object of this invention is to provide a magnetic video recording and reproducing apparatus in which the magnetic tape can be drawn out from the magazine smoothly and easily as compared with the conventional apparatus.

Another object of this invention is to provide a magnetic video recording and reproducing apparatus which can be assembled with high accuracy in the relative positions of the magazine loading section to the rotary magnetic head assembly, the magnetic tape threading means, the first and second position defining means and the magnetic drive means, and the rotary magnetic head assembly to each of the first position defining means, the magnetic tape threading means and the second position defining means.

Other objects, features and advantages of this invention will become apparent from the following description taken in conjunction with the accompanying drawings.

DESCRIPTION OF THE PREFERRED EMBODIMENTS

Figure 1:
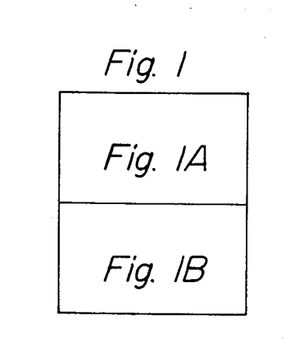
FIG. 1 is a view showing the arrangement of FIGS. 1a and 1b.
Figure 1A:
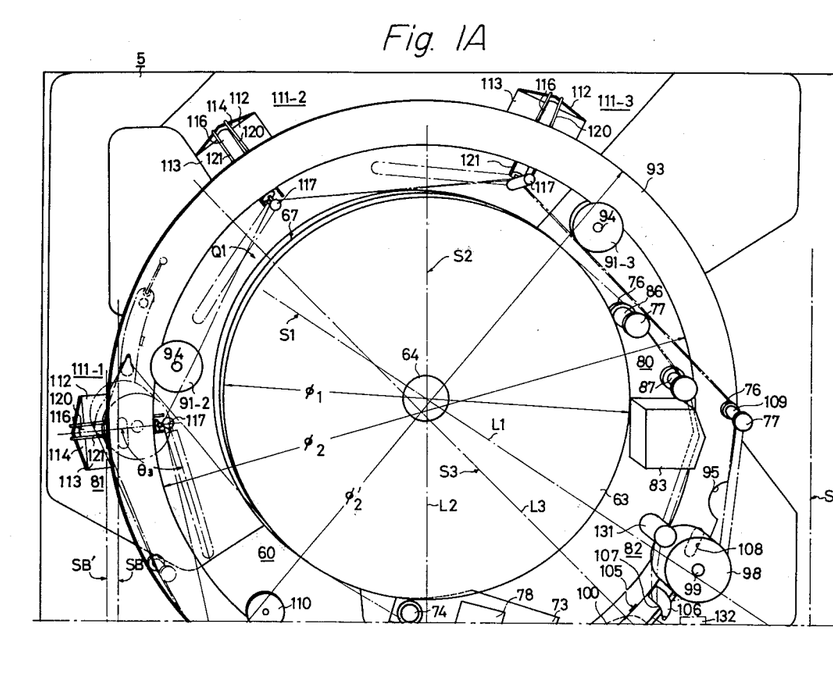
FIGS. 1a and 1b are plan views showing one example of magnetic video recording and reproducing apparatus of this invention.
Figure 1B:
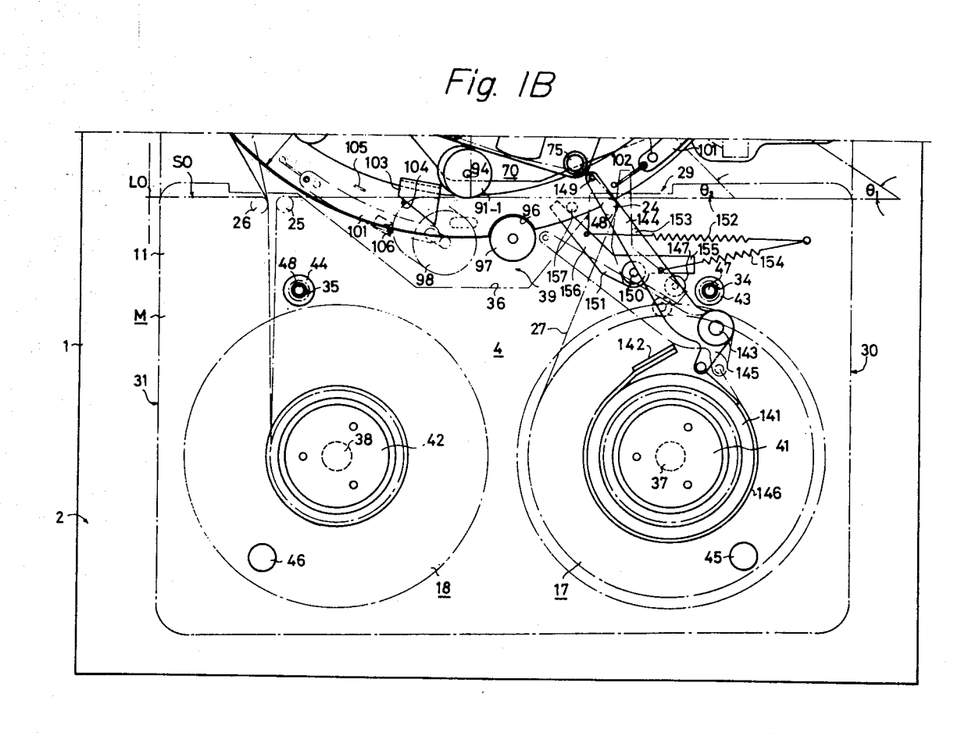
Figure 2:
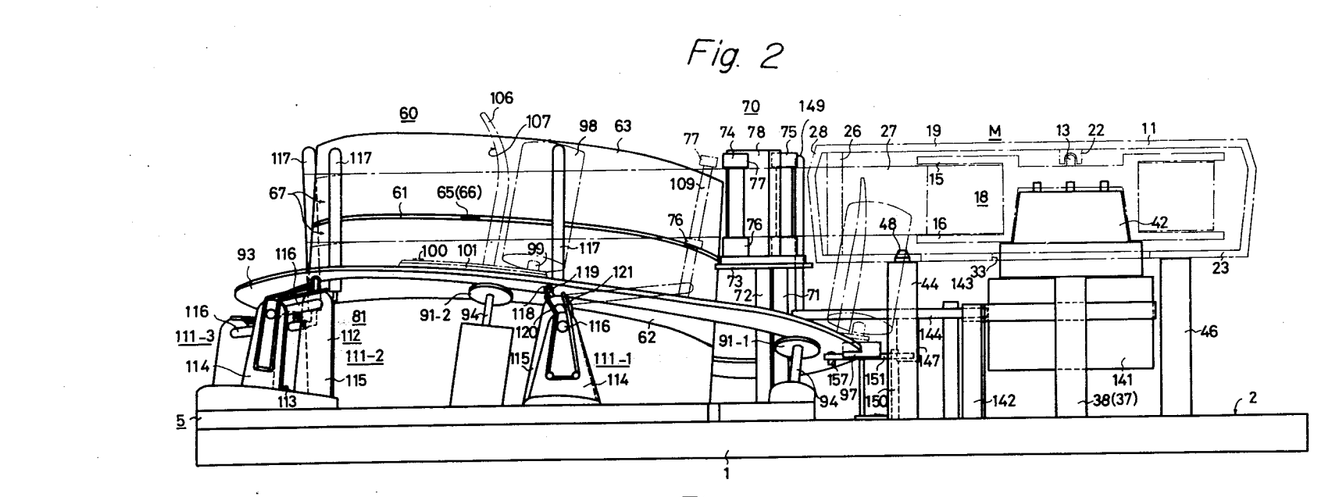
FIG. 2 is a left side of the apparatus depicted in FIG. 1.

In FIGS. 1 and 2, reference numeral 1 indicates a main chassis. On the forward portion of its main surface 2, there is provided a magazine loading section 4 on which a magazine M is loaded and, on the backward portion of the main surface 2 of the main chassis 1, there is mounted a sub-chassis 5.

Figure 3A:
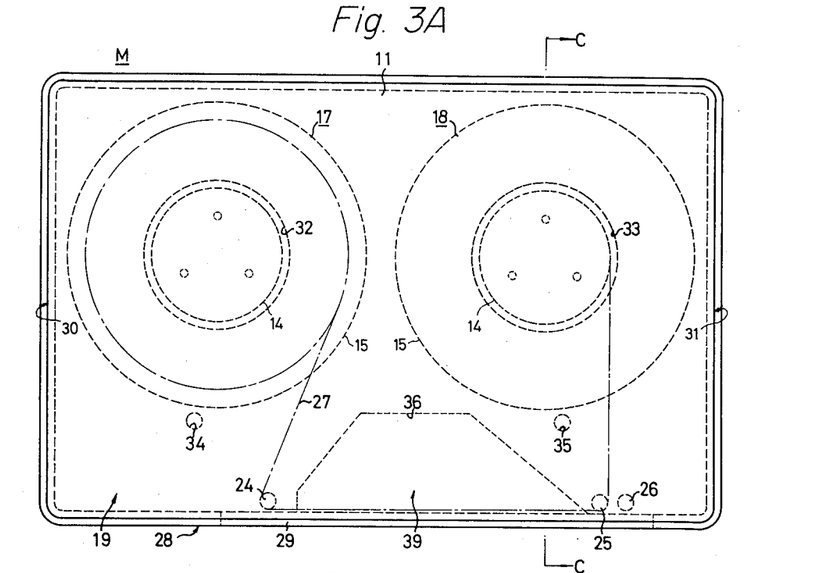
FIGS. 3A, 3B and 3C are a plan view, a front view and a sectional view taken on the line C—C in FIG. 3A, illustrating a magazine for use in this invention.
Figure 3B:
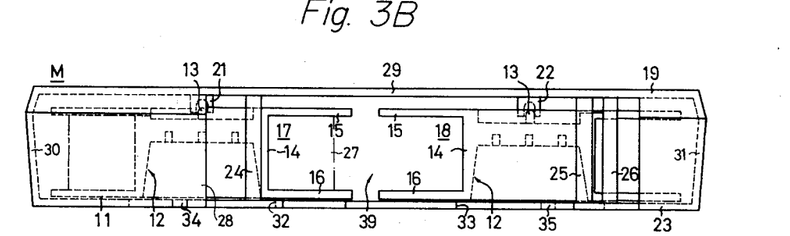
Figure 3C:
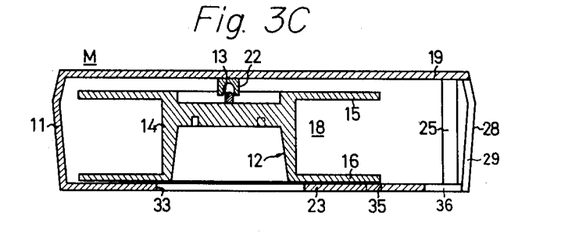

One example of the magazine M, which is loaded on the magazine loading section 4, has such a construction as shown in FIGS. 3A, 3B and 3C, in which supply and take-up reels 17 and 18 are rotatably disposed in a casing 11 at the left- and right-hand positions therein. The supply and take-up reels 17 and 18 are each composed of a bobbin 14 having formed therein a reel support receiving hole 12 on the side of the bottom plate 23 of the casing 11 and having planted thereon a central shaft 13 projecting up towards a top plate 19 of the casing 11, and a pair of opposing flanges 15 and 16 extending outwardly from the upper and lower outer peripheries of the bobbin 14 in its radial direction. In this case, the central shafts 13 of the reels 17 and 18 are journalled to bearings 21 and 22 provided on the top plate 19 of the casing 11, respectively. At the left-hand position near the front of the casing 11, there is planted on the top plate 19 a guide pin 24 extending down between the top and bottom plates 19 and 23. Further, at the right-hand position near the front of the casing 11, a pair of guide pins 25 and 26 (the pin 25 being left-hand), similarly extending down between the top and bottom plates 19 and 23, are planted on the top plate 19 in adjacent but a little spaced relation to each other. Moreover, a front plate 28 of the casing has formed therein a tape drawing-out window 29 extending laterally from a position further to the left than the pin 24 to a position further to the right than the pin 26. In the bottom plate 23 of the casing 11, reel support insertion holes 32 and 33 through which the reel support receiving holes 12 of the reels 17 and 18 are exposed to the outside, respectively, are formed at those positions corresponding to the above reel support receiving holes 12, respectively. Further, positioning holes 34 and 35 are formed in the bottom plate 23 forwardly of the above reel support insertion holes 32 and 33, respectively. Moreover, the bottom plate 23 has formed therein a recess 36 which communicates with the aforementioned window 29 and extending rearwardly of the front edge of the bottom plate 23 from the right-hand side of the pin 24 to the left-hand side of the pin 25. The casing 11 of the magazine M has housed therein a magnetic tape 27 which is drawn out from the reel 17 and wound on the reel 18, passing across the pin 24 and between the pins 25 and 26. Accordingly, the tape 27 is exposed to the outside through the window 29 and there is formed behind the tape 27 a space 39 which communincates with the outside through the recess 36 formed in the bottom plate 23 of the casing 11.

The magazine loading section 4 is composed of supply and take-up reel shafts 37 and 38 corresponding to the aforesaid reel support holes 12 of the reels 17 and 18 of the magazine M, the reel shafts 37 and 38 being rotatably journalled (by suitable means, though not shown) on the main surface 2 of the main chassis 1 at its forward right and left positions perpendicularly to the main surface 2; reel supports 41 and 42 mounted on the reel shafts 37 and 38, respectively; magazine supports 43 and 44 of the same height which support at their free end faces the aforesaid bottom plate 23 of the magazine M and correspond to the aforementioned holes 34 and 35 for positioning the magazine M, respectively, the magazine supports 43 and 44 being planted on the main surface 2 of the main chassis 1 perpendicularly thereto at positions respectively spaced a little to the left and right from the reel supports 41 and 42 rearwardly thereof; magazine supports 45 and 46 of the same height as the above magazine supports 43 and 44 which similarly support at their free end faces the bottom plate 23 of the magazine M, the magazine supports 45 and 46 being planted on the main surface 2 of the main chassis 1 perpendicularly thereto at positions respectively spaced a little to the left and right from the reel supports 41 and 42 forwardly thereof; and magazine positioning pins 47 and 48 respectively planted on the free end faces of the magazine supports 43 and 44.

On such a magazine loading section 4, the magazine M is loaded from above with its front panel 28 positioned on the rear side of the loading section 4 and with the bottom plate 23 resting on the magazine supports 43 to 46 of the loading section 4, as indicated by chain lines in FIGS. 1 and 2. In this case, since the magazine supports 43 to 46 are of the same height relative to the main surface 2, the height of the magazine M from the main surface 2 of the main chassis 1 is defined with its top and bottom plates 19 and 23 being held in parallel with the main surface 2. Further, since the magazine positioning pins 47 and 48 are inserted into the positioning holes 34 and 35 of the magazine M, respectively, the magazine M is loaded in the defined position. Moreover, the reel supports 41 and 42 are inserted into the holes 12 of the reels 17 and 18, respectively, so that, by driving the reel shafts 37 and 38 with a reel shaft drive mechanism provided under the chassis 1 (not shown), the magnetic tape 27 in the magazine M is transferred from the reel 17 to the reel 18 or vice versa.

Figure 4:
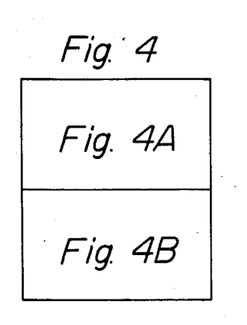
FIGS. 4 is a view showing the arrangement of FIGS. 4A and 4B.
Figure 4A:
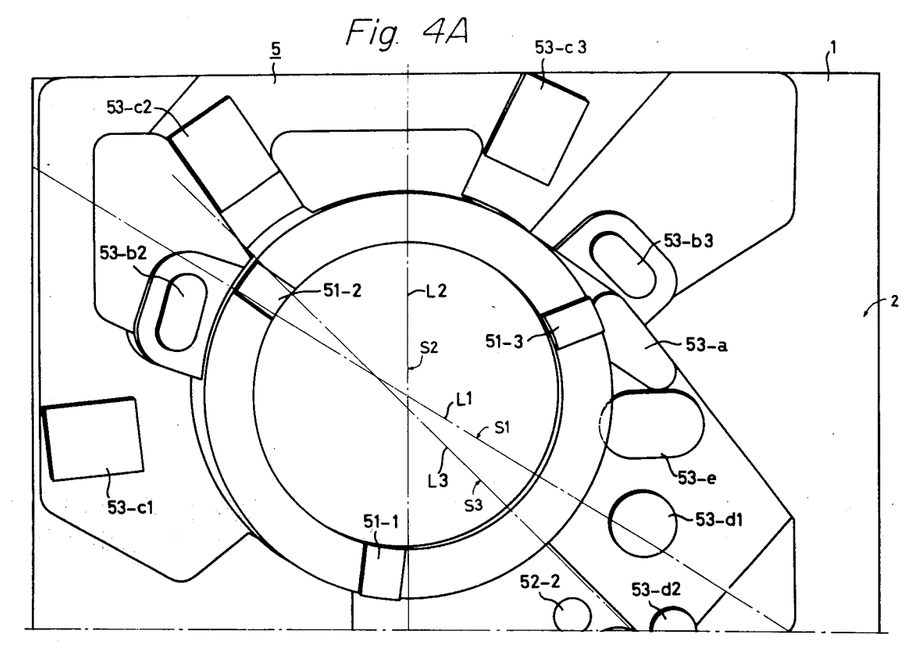
FIGS. 4A and 4B are plan views respectively showing a main chassis and a sub-chassis mounted thereon for use in this invention.
Figure 4B:
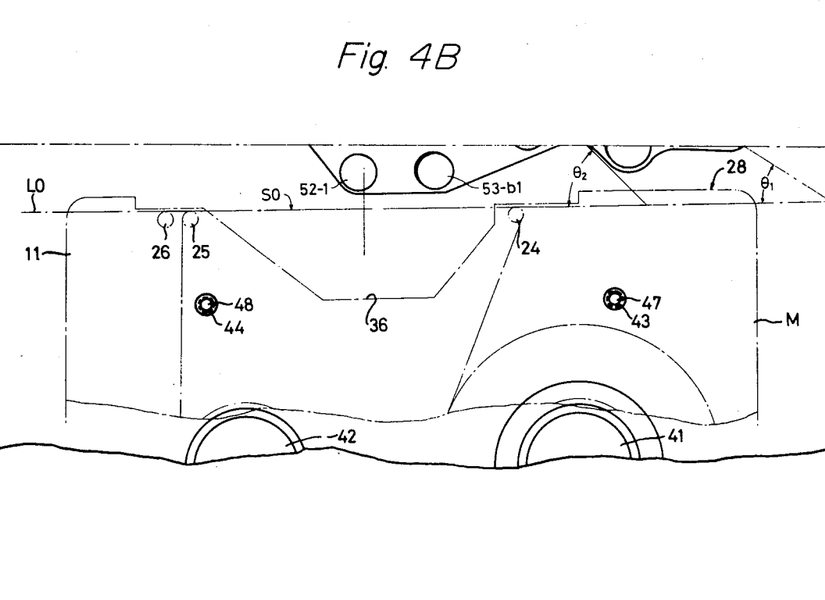
Figure 4C:
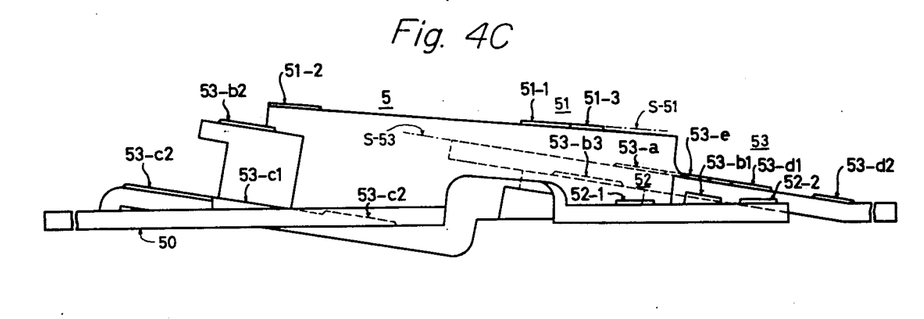
FIG. 4C is a side view of the apparatus of FIGS. 4A and 4B viewed from the left-hand side of the line L1 in the direction perpendicular thereto.

The sub-chassis 5 is produced, for example, by casting. As is apparent from FIGS. 4A, 4B and 4C, the sub-chassis 5 has an underside 50 which makes contact with the backward portion of the main surface 2 of the main chassis 1; a first mounting face 51 which is inclined, for example, at about 5°, to the underside 50, and consequently the main surface 2 of the main chassis 1; a second mounting face 52 which is parallel to the underside 50, and consequently the main surface 2; and a third mounting face 53 which is inclined for example, at about 10°, to the underside 50, and consequently the main surface 2.

In plan views (FIGS. 1 and 4A and 4B) of the apparatus of this invention with the magazine M loaded on the loading section 4 as described above, consider an imaginary plane (identified by S0) perpendicular to the main surface 2 of the main chassis 1 which includes a line L0 joining the pins 24 and 25, an imaginary plane (identified by S2) perpendicular to the main surface 2 of the main chassis 1 which includes a line L2 crossing the line L0 perpendicularly thereto at the central point or its vicinity between the pins 24 and 25, and an imaginary plane (identified by S1) perpendicular to the main surface 2 of the main chassis 1 which includes a line L1 crossing the line L2 at a point spaced a predetermined distance away from the point of intersection of the lines L0 and L2 and inclined at an angle $\theta$, of, for example, about 32° (usually in the range of 45°±15°). The first mounting face 51 is perpendicular to the imaginary plane S1 and gradually approaches the main surface 2 as the intersecting line of the imaginary planes S0 and S1 is approached from the side of the intersecting line of the imaginary planes S2 and S1. In the reverse direction, the first mounting face 51 gradually goes away from the main chassis 2. Accordingly, the first mounting face 51 is inclined about 5° in the forward right direction thereof. Further, the first mounting face 51 is composed of, for example, three flat members 51-1, 51-2 and 51-3 in a common plane which are disposed at predetermined intervals on an annular region with its center at the intersecting line of the imaginary planes S1 and S2 or a point in its vicinity on the line L2, viewed from the direction perpendicular to an imaginary plane (identified by S-51) parallel to the mounting face 51.

The second mounting face 52 is composed of flat members 52-1 and 52-2 in a common plane which are disposed at a forward central position and at a forward right position respectively on the outside of the region (elliptic) in which the flat members 51-1 to 51-3 of the first mounting face 51 are arranged.

Further, consider an imaginary plane (identified by S3) perpendicular to the main surface 2 which includes a line L3 crossing the line L2 at a point spaced a predetermined distance away from the point of intersection of the lines L0 and L2 (the intersecting point of the lines L2 and L3 or a point in its vicinity) and inclined at an angle $\theta_2$ of, for example 42° (usually in the range of 45°±15°), to the line L0. The third mounting face 53 is perpendicular to the imaginary plane S3 and gradually approaches to the main surface 2 as the side of the line of intersection of the imaginary planes S0 and S3 from the side of the line of intersection of the imaginary planes S2 and S3 and, in the reverse direction, the third mounting face 53 goes away from the main surface 2. Accordingly, the third mounting face 53 is inclined in the forward right direction as is the case with the first mounting face 51 but it is inclined at an angle of about 10° different from that of the first mounting face 51. The third mounting face 53 comprises flat member 53-a, 53-b1, 53-b2, 53-b3, 53-c1, 53-c2, 53-c3, 53-d1, 53-d2 and 53-e. The flat member 53-a is disposed on the outside of the elliptic annular region of arrangement of the flat members 51-1 to 51-3 of the first mounting face 51 at a position substantially symmetrical to the aforesaid flat member 52-1 with respect to the line L1. The flat members 53-b1, 53-b2 and 53-b3 are disposed in a plane parallel to the flat member 53-a at predetermined intervals on an imaginary annular region (surrounding the elliptic annular, region of arrangement of the flat members 51-1 to 51-3 of the first mounting face 51) with its center at the intersecting line of the imaginary planes S1 and S2 or a point in its vicinity on the line L3, viewed from the direction perpendicular to the imaginary plane S-53 parallel to the first mounting face 51. The flat members 53-c1 to 53-c3 are disposed in a common plane different from that of the aforementioned flat members 53-b1 to 53-b3 at predetermined intervals on an imaginary annular region, surrounding the aforesaid imaginary annular region of arrangement of the flat members 53-b1 to 53-b3 and concentric therewith, in an area extending clockwise from the position corresponding to the aforesaid flat member 52-1 of the second mounting face 52 to the position corresponding to the aforesaid flat member 53-a, viewed from the direction perpendicular to the imaginary plane S-51. The flat members 53-d1 and 53-d2 are disposed on the region of arrangement of the flat members 53-b1 to 53-b3 and on the outside thereof, respectively, but at forward right positions (in plan view, and they lie in the plane common to the above flat members 53-b1 to 53-b3. The flat member 53-e is disposed in the plane common to the flat members 53-b1 to 53-b3 but at a little forward right position (in the plan view), on the region of arrangement of the flat members 53-b1 to 53-b3 or in its vicinity.

On the first mounting face 51 of the sub-chassis 5, a rotary magnetic head assembly 60 is mounted.

Since the rotary magnetic head assembly 60 is known, no detailed description will be given thereof. The rotary magnetic head assembly 60 has two cylindrical members 62 and 63 of the same outer diameter $\phi_1$ which are concentrically placed one on the other with a small gap 61 defined therebetween, and is mounted by appropriate means on the subchassis 5 with the lower end face of the lower cylindrical member 62 perpendicular to its axis being rested on the flat members 51-1 to 51-3 of the mounting face 51 of the sub-chassis 5. In this case, the upper cylindrical member 63 has affixed thereto a rotary shaft 64 by proper means, and hence is rotatable. Further, the cylindrical member 63 has attached thereto at its lower marginal edge two rotary magnetic heads 65 and 66 spaced apart an angular distance of about 180° with their tips slightly projecting out from a tape guide surface 67 formed by the outer peripheral surfaces of the cylindrical members 62 and 63.

Accordingly, the rotary magnetic heads 65 and 66 are adapted to be rotatable in a plane (parallel to the aforesaid imaginary plane S-51) which is inclined at about 5° to the main surface 2 of the main chassis 1 perpendicular to that imaginary plane S1 which is vertical to the main surface 2, including the aforementioned line L1. The center of rotation of the rotary magnetic heads 65 and 66 in the plane of rotation is disposed on the line L2. Further, the outer diameters $\phi_1$ of the cylindrical members 62 and 63 have a value smaller than the inner diameter $\phi_2$ of a rotary ring 93 described later, and the cylindrical members 62 and 63 are disposed with the front portion of the type guide surface 67 adjacent to the aforesaid imaginary plane SO which is vertical to the main surface 2, including the line LO. The height of the rotary magnetic head assembly 60 relative to the main surface 2 of the main chassis 1 will become apparent from a description which will be given later in connection with the operation of the apparatus of this invention.

On the second mounting face 52 of the sub-chassis 5 referred to previously, first position defining means 70 is mounted.

The means 70 has pins 71 and 72 of the same length which are planted on the flat members 52-1 and 52-2 of the mounting face 52 perpendicularly thereto. Between the end faces of the pins 71 and 72 is bridged a support 73, on which are planted two identical position defining pins 74 and 75 extending in a direction perpendicular to the mounting face 52. In this case, each of the pins 74 and 75 has attached thereto a pair of flanges 76 and 77 spaced apart a distance corresponding to the width of the magnetic tape 27 in the aforementioned magazine M. The pin 74 is disposed adjacent to the center of the front portion of the tape guide surface 67 of the rotary magnetic head assembly 60. The pin 75 is disposed on the right of the pin 74 a little forwardly thereof. Further, an erasing magnetic head 78 is mounted on the plate 73 between the pins 74 and 75.

On the third mounting face 53 of the sub-chassis 5, there are mounted second position defining means 80, tape threading means 81, tape drive means 82 and a control magnetic head 83.

The second position defining means 80 comprises two identical pins 86 and 87 each of which has a pair of flanges 76 and 77 similar to those of the pins 74 and 75. The pins 86 and 87 are planted on the flat member 53-a of the mounting face 53 in a direction perpendicular thereto. In this case, the pin 86 is disposed substantially symmetrically to the pin 74 with respect to the aforementioned imaginary plane S1, and accordingly adjacent to the tape guide surface 67 of the rotary magnetic head assembly 60 on its right but a little rearwardly of its center. The pin 87 is placed at the front right of the pin 86.

The tape threading means 81 is provided with identical pulleys 91-1, 91-2 and 91-3 provided respectively corresponding to the flat members 53-b1 to 53-b3 of the mounting face 53, and the rotary ring 93 which is guided by the pulleys 91-1 to 91-3 to rotate. Shafts 94 of the pulleys 91-1 to 91-3 are planted respectively on the flat members 53-b1 to 53-b3 to extend perpendicularly thereto, with the pulleys 91-1 to 91-3 engaging the inner edge of the rotary ring 93. Accordingly, the rotary ring 93 is adapted to be rotatable in a plane (parallel to the aforesaid imaginary plane S-53) which is inclined at about 10° to the main surface 2 of the main chassis 1 perpendicular to the imaginary plane S3 which is vertical to the main surface 2, including the aforementioned line L3. In this case, the outer diameter $\phi_2'$ of the rotary ring 93 is selected to be smaller than the distance between the left and right-hand side 30 and 31 of the magazine M. The rotary ring 93 is disposed in the space defined between an imaginary plane SA extending from the left-hand side 30 (the right-hand side in FIG. 1) of the magazine M loaded on the loading section 4 and an imaginary plane SB extending from the right-hand side 31 (the left-hand side in FIG. 1) of the magazine M or an imaginary plane SB' extending on the outside thereof in adjacent but a little spaced relation. Further, the rotary ring 93 is positioned as close to the loading section 4 as possible so that one part of the ring 93 is disposed under the magazine M loaded on the loading section 4.

The outer periphery of the rotary ring 93 has formed therein recesses 95 and 96 spaced apart an angular distance of, for example, about 290°. On the other hand, an engaging piece 97, which is pressed (by some means not shown), against the outer periphery of the ring 93, is provided on the main surface 2 of the main chassis 1 at a position, for example, under the magazine M loaded on the loading section 4. The rotary ring 93 is designed so that it assumes a first rotational position where its recess 95 engages the engaging piece 97 and rotates clockwise from the rotational position through about 290° to assume a second rotational position where the recess 96 engages the engaging pieces 97.

Further, the rotary ring 93 has mounted thereon a pinch roller 98 which is positioned in the space 39 in the magazine M loaded on the loading section 4 at the first rotational position of the rotary ring 93. In this case, the shaft 99 of the pinch roller 98 is planted on the free end of a rotary arm 101 which is pivoted to a pin 100 planted on the rotary ring 93 and extends anticlockwise in direction of extension of the rotary ring 93. On the other hand, the rotary arm 101 is pulled anticlockwise by a spring 102 stretched between the rotary arm 101 and the ring 93 so that it may be urged against a cam surface 104 of a cam plate 103 mounted (by some means, though not shown) on the main chassis 1 when the rotary ring 93 is in its first rotational position and that it may be engaged with an engaging piece 105 mounted on the ring 93 when the ring 93 lies at a rotational position other than the first one. In this case, the cam surface 104 of the cam plate 103 is gradually tapered in the anticlockwise direction along the ring 93, so that when the ring 93 is in its first rotational position, the pinch roller 98 assumes its maximum forward position in the space 39 of the magazine M, and when the ring 93 rotates clockwise from the above position, the pinch roller 98 moves in a backward left direction. Accordingly, the pinch roller 98 can easily be brought out of the space 39.

The outer diameter of the pinch roller 98 is selected such that when the arm 101 is in engagement with the engaging piece 105, one part of the outer peripheral surface of the pinch roller 98 may sufficiently project out of the inner periphery of the ring 93. On the arm 101 carrying the pinch roller 98, there is planted a tape drawing-out and guide pin 106 spaced apart from the position of the pinch roller 98 in the clockwise direction along the ring 93. Consequently, the pinch roller 98 is disposed at such a position that it follows the pin 106 when the rotary ring 93 rotates from its first rotational position to the second one. In this case, when the rotary ring 93 lies in its first rotational position, the pin 106 is positioned in the space 39 of the magazine M together with the pinch roller 98. The pin 106 has a specified shape which will become apparent from the subsequent description given of the operation of the present apparatus.

The rotary ring 93 has formed therein a guide hole 108 at a very short distance from the position of the pinch roller 98 in the anticlockwise direction. Namely, the guide hole 108 receives engaging rollers 118 mounted on the free ends of rods 119 of tape guide mechanisms 111-1 to 111-3 of the rotary ring 93 at a position immediately subsequent to the pinch roller 98 when the ring 93 rotates from its first rotational position to its second one. Further, a tape guide pin 109, which has a pair of flanges 76 and 77 similar to those of the aforesaid tape guide pins 74 and 75, 86 and 84, are planted on the rotary ring 93 perpendicularly thereto at a position spaced apart a predetermined distance from the pinch roller 98 in the anticlockwise direction.

Moreover, the rotary ring 93 is designed to be rotated between the aforesaid first and second rotational positions in the so-called rim-drive manner by a driving wheel 110 which is mounted on the main surface 2 of the main chassis 1 and makes rotary contact with the inner peripheral surface of the ring 93. (Neither mounting means nor driving mechanism of the driving wheel 110 is shown.)

The tape threading means 81 has the tapae guide mechanisms 111-1, 111-2, and 111-3 provided corresponding to the flat members 53-c1 to 53-c3 of the mounting face 53, respectively. The tape guide mechanism 111-1 has a U-shaped angle bracket 112, whose bottom 113 is fixed to the flat member 53-c1. In this case, the angle bracket 112 is disposed at such a position relative to the ring 93 that a line joining opposed plates 114 and 115 of the bracket 112 may pass through an imaginary axis of the ring 93 or a point in its vicinity. Further, the mechanism 111-1 has a rotary shaft 116 bridged between the opposed plates 114 and 115 of the angle bracket 112 in a rotatable manner and a tape guide pin 117 extending from the rotary shaft 116. In this case, the rotary shaft 116 and the pin 117 make an angle $\theta_3$ relative to each other in the range of 110°±15° on an imaginary plane including them. The rotary shaft 116 extends from the outside of the outer periphery of the rotary ring 93 to the inside of its inner periphery in the direction of the side of the rotary magnetic head assembly 60, passing under the ring 93 in such a manner that it goes closer to an imaginary plane of the ring 93 as it extends inwardly. The pin 117 is disposed to lie in a space between the inner periphery of the ring 93 and the tape guide surface 67 of the rotary magnetic head assembly 60 at all times.

A rod 119, which carries at its free end the engaging roller 118 as an engaging member, is attached to the rotary shaft 116 from which the pin 117 extends. In this case, an imaginary plane including the rotary shaft 116 and the rod 119 is different from the aforesaid one including the shaft 116 and the pin 117. The roller 118 normally lies on the underside of the rotary ring 93 but is adapted to lie in the aforesaid engaging hole 108 formed in the ring 93 when the engaging hole 108 stays above the tape guide mechanism 111-1. The rotary shaft 116 is biased clockwise and anticlockwise by springs 120 and 121 interposed between the rod 119 and the angle bracket 112 respectively in such a manner that the position where the roller 118 stays in the engaging hole 108 may be neutral. Consequently, if the engaging hole 108 is not above the tape guide mechanism 111-1, the roller 118 makes contact with the underside of the rotary ring 93 against the biasing force of either one of the springs 120 and 121. In the state that the roller 118 is pressed against the underside of the rotary ring 93 by the force of the spring 120, the pin 117 is held in its upright position in the direction substantially perpendicular to the imaginary plane formed by the rotary ring 93 and consequently to the aforementioned mounting face 53 (the imaginary plane S-53). In such a case, the pin 117 is held adjacent to the tape guide surface 67 of the rotary magnetic head assembly 60 and the free end of the pin 117 is at a sufficient height relative to the imaginary plane of the rotary ring 93. Further, where the roller 118 is urged against the underside of the rotary ring 93 by the force of the spring 121, the free end of the pin 117 is held close to the imaginary plane of the ring 93, that is, the pin 117 is held in its lowered position.

The tape guide mechanisms 111-2 and 111-3 are exactly identical in construction with the tape guide mechanism 111-1 described above, so that their parts corresponding to those in the mechanism 111-1 are marked with the same reference numerals and no detailed description will be repeated. The bottoms 113 of their angle brackets 112 are fixed to the flat members 53-c and 53-b of the third mounting face 53, respectively.

The tape drive means 82 mounted on the third mounting face 53 of the sub-chassis 5 has a capstan 131 coupled with an appropriate rotating means, which capstan 131 is pivoted (by appropriate means though not shown) to the flat member 53-d1 of the mounting face 53 perpendicularly thereto. On the other hand, a brake drum 141 is mounted on the aforementioned supply reel shaft 37 at a position below the reel support 41. On the main surface 2 of the main chassis 1, there are planted a post 142 and a pin 143 behind the drum 141 a little to the left and right, respectively. A tension arm 144 is pivoted to the pin 143 and a brake shoe 146 is directed around the brake drum 141 between the one free end 145 of the tension arm 144 and the post 142. Further, the tension arm 144 has planted thereon a downward pin 147 on the opposite side from the free end 145 and an upward tape guide pin 149 on the other free end 148. On the main surface 2, a pin 150 is planted behind the pin 143 on the left side thereof and an arm 151 is rotatably mounted on the pin 150. The arm 151 is biased to rotate clockwise by a spring 152 interposed between the arm 151 and the main chassis 1 and the rotation of the arm 151 is stopped by a stopper 153 planted on the main chassis 1. Further, the tension arm 144 is biased to rotate clockwise by a spring 154 stretched between the tension arm 144 and the main chassis 1, so that the pin 147 is urged against the one end portion 155 of the arm 151. In this case, however, since the biasing force of the spring 154 is weaker than that of the spring 152, the arm 151 is held in contact with the stopper 153 and the rotational movement of the arm 144 is limited by the engagement of its pin 147 with the end portion 155 of the arm 151. In the state that the arm 151 is urged against the stopper 153 and that the pin 147 of the arm 144 is also pressed against the end portion 155 of the arm 151, the pin 149 is positioned in the space 39 of the casing 11 of the magazine M and the contact pressure of the brake shoe 146 to the brake drum 141 is minimum.

On the underside of the rotary ring 93, a pin 157 is planted which engages the other end portion of the 156 of the aforesaid arm 151 to rotate anticlockwise the arm 151 against the force of the spring 152 while the ring 93 moves to its second rotational position from a position immediately before it after having moved from the first rotational position. Consequently, when the rotary ring 93 is in its second rotational position, the arm 151 assumes its maximum rotational position in the anticlockwise direction and the arm 144 also assumes its maximum rotational position in the clockwise direction correspondingly, so that the contact pressure of the brake shoe 146 to the brake drum 141 becomes maximum.

The construction of one example of this invention has been outlined but will be further described together with its operation. The magazine M described previously with regard to FIGS. 3A, 3B and 3C is loaded on the magazine loading section 4 in the manner described previously. Before loading the magazine M on the magazine loading section 4, the rotary ring 93 of the tape threading means stays in its first rotational position with its recess 95 in engagement with the engaging position with its recess 95 in engagement with the engaging piece 97. Accordingly, when the magazine M is loaded on the loading section 4, the pinch roller 98 and the tape drawing-out and guide pin 106 on the rotary ring 93 are brought into the space 39 of the casing 11 of the magazine M through the recess 36. In this case, since the pin 106 and the pinch roller 98 are mounted on the rotary arm 101 biased by the spring 102 and since the arm 101 is engaged with the cam surface 104 of the cam plate 103, the pin 106 and the pinch roller 98 lie adjacent to the back of the tape 27 stretching between the guide pins 24 and 25 in the casing 11 of the magazine M.

Then, the engaging piece 97 is disengaged from the recess 95 and the driving wheel 110 is driven, by which the rotary ring 93 is rotated clockwise in FIG. 1. When the rotary ring 93 has thus been rotated to bring the recess 96 to the position corresponding to the engaging piece 97, which is normally pressed against the peripheral surface of the ring 93, is pressed into the recess 96 to put the ring 93 in its second rotational position. At this time, driving of the driving wheel 110 is stopped.

When the rotary ring 93 rotates from its first rotational position, the pin 106 and the pinch roller 98 move in a backward left direction correspondingly. Consequently, the tape 27 stretching between the pins 24 and 25 in the magazine M is pulled out by the pin 106 and the pinch roller 98 in a backward left direction and furhter pulled out from the side of the reel 18 in the backward left direction while forming a loop connecting the pin 24 of the magazine M, the pinch roller 98, the pin 106 and the pin 25, and then the tape 27 is further pulled out from the side of the reel 18 in the backward left direction while forming a loop connecting the pin 24, the pinch roller 98, the pin 106 and the pin 26. In this manner, the rotary ring 93 rotates to gradually draw out the tape 27 and when the engaging hole 108 has reached the position of the tape guide mechanism 111-1, the roller 118 mounted on the rod 119 of this mechanism 111-1 and pressed against the underside of the ring 93 is brought into engagement with the engaging hole 108, by which the rod 119, and consequently the rotary shaft 116 is rotated clockwise, viewed from the direction of the outer end face of the shaft 116. When the rotary ring 93 further rotates to disengage the roller 118 from the hole 108 to press it against the underside of the ring 93, the tape guide pin 117 extending from the rotary shaft 116 stands upright. In this case, standing-up of the pin 117 is performed on the inside of the enlarged loop of the tape 27 guided across the pin 24 of the magazine M, the pinch roller 98, the pin 106 and the pin 26, so that the tape 27 does not ever hinder standing-up of the pin 117.

When the rotary ring 93 further rotates after the pin 117 of the tape guide mechanism 111-1 stands up, the tape 27 is drawn out further rearwardly while forming a loop across the pin 24 of the magazine M, the pinch roller 98, the pin 106, the pin 117 and the pin 26. Then, when the engaging hole 108 of the rotary ring 93 has run past the position of the next tape guide mechanism 111-2, the pin 117 of this mechanism 111-2 stands up in the same manner as described above and the tape 27 is further drawn out while forming a loop across the pin 24 of the magazine M, the pinch roller 98, the pin 106, the pin 117 of the tape guide mechanism 111-2, the pin 117 of the tape guide mechanism 111-1 and the pin 26 of the magazine M. Thereafter, when the hole 108 of the rotary ring 93 has run past the position of the next tape guide mechanism 111-3, the pin 117 of this guide mechanism 111-3 similarly stands up and the tape 27 is further drawn out while forming a loop across the pin 24 of the magazine M, the pinch roller 98, the pin 106, the pins 117 of the tape guide mechanisms 111-3, 111-2 and 111-1 and the pin 26.

When the rotary ring 93 reaches its second rotational position with its recess 96 engaging piece 97 after having rotated while drawing out the tape 27, the arm 151 associated with the tension arm 144 begins to be turned anticlockwise in FIG. 1 against the force of the spring 152 by the pin 157 mounted on the ring 93 immediately before the ring 93 assumes its secnd rotational position. At the same time, the tension arm 144 is turned clockwise in FIG. 1 by the force of the spring 154, so that the tape guide pin 149 planted on the arm 144 is moved in a backward right direction, thereby forming a loop of the tape 27 drawn out of the reel 17 to the reel 18 across the pin 149, the first position defining pins 75 and 74, the second position defining pins 86 and 87, the pinch roller 98, the pin 106, the pin 109, the pins 117 of the tape guide mechanisms 111-3, 111-2 and 111-1 and the pin 26. In this case, the tape loop thus formed is also guided on the tape guide surface 67 of the rotary magnetic head assembly 60. Consequently, the tape 27 is trained about the tape guide surface 67 from its front left position to its rear right position such that the tape covers an angular range of a little larger than 180°.Thus, the tape 27 is loaded on the tape guide surface 67.

In such a state that the tape 27 is thus loaded on the tape guide surface 67, the upper and lower edges of the tape 27 are substantially parallel with the main surface 2 of the main chassis 1 between the reel 17 in the magazine M and the pin 149 of the tension arm 144 and between the pin 149 and the position defining pin 74. Between the position defining pin 74 and the position on the magnetic tape guide surface 67 of the rotary magnetic head assembly 60 corresponding to the highest point on the plane of rotation of the rotary magnetic heads 65 and 66 relative to the main surface 2 or a position in the vicinity of the above position (identified by Q1), the upper and lower edges of the tape 27 are substantially parallel to the main surface 2 or a little inclined thereto such that they gradually go near the main surface 2 as the latter position is approached. Between the position Q1 and the position defining pin 86, the upper and lower edges of the tape are relatively greatly inclined to the main surface 2 such that they go near the main surface 2 as the pin 86 is approached. Between the pins 86 and 106, the upper and lower edges of the tape are inclined at substantially the same angle as that between the position Q1 and the pin 86. Between the pins 106 and 109, the upper and lower edges of the tape are inclined at substantially the same angle as that between the pins 86 and 106. Between the pins 109 and the pin 117 of the tape guide mechanism 111-3 and between the latter and the pin 117 of the tape guide mechanism 111-2, the edges are inclined to the main surface 2 in such a manner as to go away from the main surface 2 as the tape 27 approaches the mechanism 111-2. Between the pins 117 of the tape guide mechanisms 111-2 and 111-1, the edges are inclined to the main surface 2 in such a manner as to go away therefrom as the tape 27 approaches the mechanism 111-1, or the edges are substantially parallel to the main surface 2. Between the pin 117 of the tape guide mechanism 111-1 and the pin 26, the edges are substantially parallel to the main surface 2.

The tape 27 can be loaded very easily on the tape guide surface 67 by the presence of the pin 106 planted on the rotary arm 101 mounted on the rotary ring 93 for the following reason. Namely, the outer peripheral surface of the pin 106 has a curved surface portion 107 and this curved portion 107 applies a component of force to the tape 27 for bringing its upper marginal edge slightly towards the main surface 2 or holding the upper marginal edge substantially in parallel to the main surface 2 while the pin 106 moves from its position in the space 39 of the magazine M to its remotest position from the main surface 2 or to a position near the remotest position. Further, the curved surface portion 107 applies a relatively large compcnent of force to the tape 27 for bringing its upper marginal edge greatly towards the main surface 2 while the pin 106 moves from its remotest position from the main surface 2 or the adjoining positions to the position nearest the main surface 2 or in its vicinity.

After the tape 27 is directed around the tape guide surface 67 as described above, the pinch roller 98 makes rotary contact with the capstan 131 with the tape 27 being gripped therebetween. Consequently, the tape 27 is transferred from the side of the reel 17 to the side of the reel 18 at a constant speed. In this case, the tension arm 144 receives the tensile force of the tape 27 with the pin 149 and rotates to maintain the tensile force of the tape 27 substantially constant without being limited by the arm 151. However, the rotational movement of the tension arm 144 is limited to such a range that the tape 27 travels across the pin 75 at all times. Consequently, the tape 27 is transferred while being urged against the erasing head 78 at a predetermined contact pressure. On the other hand, the contact pressure of the brake shoe 146 to the brake drum 141 varies with the rotational movement of the tension arm 144 to rapidly return the tensile force of the tape 27 to a predetermined range.

Thus, the tape 27 travels around the tape guide surface 67 of the rotary magnetic head assembly 60 at a constant speed while remaining at a tensile force of the predetermined range. By applying video signals to the rotary magnetic heads 65 and 66 while applying an erasing signal to the erasing head 78 and by applying a control signal to the control head 83, the video signals are recorded on the magnetic tape 27 in the form of skew magnetic tracks and the control signal is recorded along the lower or upper marginal edge of the tape 27 in the form of a magnetic track parallel thereto. If the magnetic tape 27 has recorded thus thereon such video and control signals, these signals are reproduced by the magnetic heads 65, 67 and 83, with the erasing head 78 being held in operative.

Signal recording on the magnetic tape 27 or playback therefrom is terminated by stopping the rotation of the capstan 131 to thereby stop driving of the tape 27. Upon completion of recording or reproducing, the engaging piece 97 is disengaged from the recess 96 of the rotary ring 93 and then the driving wheel 110 is driven in the direction opposite to that in the above case and the reel shaft 38 is driven feebly. Thus, the rotary ring 93 rotates anticlockwise from its second rotational position to the first one, during which the tape guide mechanisms 111-1 to 111-3 and other members perform operations exactly opposite to these in the case where the ring 93 rotates from the first rotational position to the second one. In this case, however, since the arm 101 of the pinch roller 98 engages the cam surface 104 of the cam plate 103, the pinch roller 98 is moved forward in FIG. 1, and consequently the pin 106 and the pinch roller 98 are smoothly brought behind the tape 27 without being hindered by the tape. Thus, the apparatus is returned to its original condition, so that the magazine M can be removed from the magazine loading section 4.

It will be apparent that many modifications and variations may be effected without departing from the scope of the novel concepts of this invention.

What is claimed is:

1. In a magnetic video recording and/or reproducing apparatus that includes a cylindrical tape guide drum having at least one rotary magnetic head moved in a circular path substantially along the periphery of said drum, a tape magazine having at least one reel around which a magnetic tape is wound, a magazine loading means having a reel drive member for driving said reel and a tape magazine support member for supporting said tape magazine in a predetermined position, a tape threading means having a rotatable support member and a tape drawing member, said rotatable support member being rotatably movable around said cylindrical tape guide drum between a tape loading and a tape operating position and said tape drawing member being mounted on said rotatable support member for drawing out said magnetic tape from said magazine loaded on said magazine loading means, and a first position defining means and a second position defining means for defining the wrapping position of a looped tape extended around the periphery of said guide drum in response to the rotational movement of said tape threading means, the improvement which comprises:
   a. a main chasis having a flat mounting area, tape magazine support means and reel drive means; and
   b. a sub-chassis mountable on said flat mounting area of the main chassis and having a first mounting area for receiving and supporting said cylindrical tape guide drum at an inclined position with respect to the main chassis, a second mounting area carrying tape positioning means defining the path of the tape around the guide drum, and a third mounting area supporting means carrying and guiding said rotatable support in its tape threading movement along a path inclined to said main chassis at one inclination greater than that of said tape guide drum.

2. A magnetic video recording and/or reproducing apparatus according to claim 1, in which said rotatable support member is in the form of a ring.

3. A magnetic video recording and/or reproducing apparatus according to claim 2, in which said ring is rotatably mounted on said third mounting surface and is rotated with a center which is eccentrically located with respect to the axis of said cylindrical tape guide drum in the direction toward said reel so as to provide a relatively large area between said ring and the drum surface of said cylindrical tape guide drum which is faced to said tape magazine loaded on said magazine loading means.

4. In a magnetic video recording and/or reproducing apparatus according to claim 3, said improvement further comprises a capstan and a pinch roller adjacent thereto by which said magnetic tape is transported, said capstan being mounted on said sub-chassis and located in said large area.

5. In a magnetic video recording and/or reproducing apparatus according to claim 3, said improvement further comprises a stationary magnetic head mounted on said sub-chassis and located on said large area for reproducing a signal from said magnetic tape.

6. In a magnetic video recording and/or reproducing apparatus according to claim 3, said improvement further comprised a stationary erase head mounted on said sub-chassis and located in said large area for erasing a recorded signal on said magnetic tape.

7. A magnetic video recording and/or reproducing apparatus according to claim 1, in which said tape drawing member mounted on said rotatable support member has a curved peripheral surface portion by which said tape is urged toward the tape drawing member mounting portion on said rotatable support member while said tape is drawn out from said magazine loaded on said magazine loading means and is threaded around said cylindrical tape guide drum.

8. A magnetic video recording and/or reproducing apparatus according to claim 1, in which said magnetic tape housed in said magazine loaded on said magazine loading means is parted from the path of rotation of said rotatable support member, and said tape drawing member mounted on said rotatable support member is movable into and out of said path of rotation, said improvement further comprises means for bringing said tape drawing member outside of said path of rotation while said rotatable support member is rotated into said tape unthreading position and for bringing said tape drawing member inside of said path of rotation while said rotatable support member is rotated into said tape threading position by which magnetic tape is housed into or drawn out from said tape magazine loaded on said magazine loading means.

9. In magnetic video recording and/or reproducing apparatus according to claim 1, said improvement further comprises:
   a. a fourth mounting surface formed as one unit body with said mounting surfaces;

b. at least one magnetic tape guide means rotatably mounted on said fourth mounting surface; and
c. an engaging member mounted on said magnetic tape guide means for engaging said magnetic tape guide means with said rotatable support member by which said tape guide means is rotatably shifted between a stand-up position and a lay-down position while said rotatable support member is rotated between said tape loading position and said tape operating position, said tape guide means extending substantially in an upward direction relative to the imaginary plane of rotation of said rotatable support member in said stant-up position in which said tape guide means is engaged with said looped tape and extending substantially along the imaginary plane of rotation of said support member in said lay-down position in which said tape guide means is released from said looped tape, said tape drawing member for drawing out said looped tape from said tape magazine loaded on said magazine loading means being used for threading one portion of said looped tape around said cylindrical tape guide drum in response to the movement of said tape threading means and said magnetic tape guide means being used for holding another portion of said looped tape away from said cylindrical tape guide drum in said stand-up position.

* * * * *